United States Patent Office 3,405,338
Patented Oct. 8, 1968

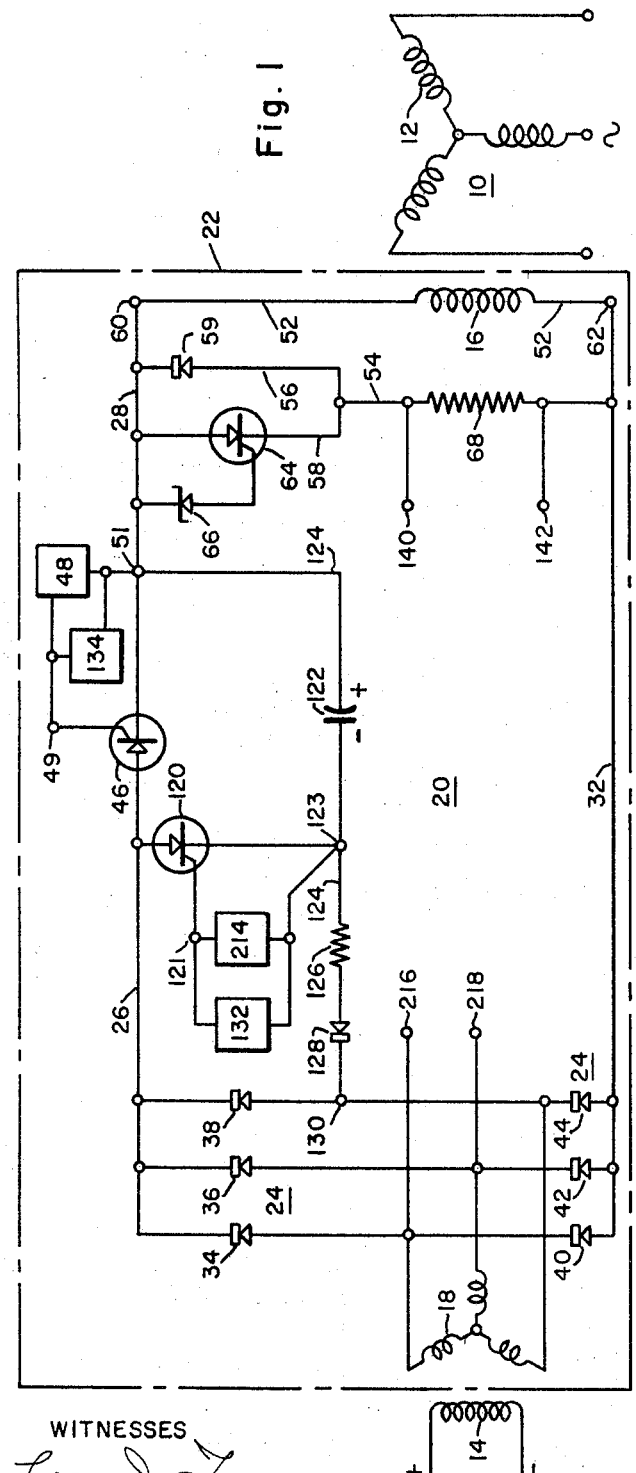

3,405,338
BRUSHLESS SYNCHRONOUS MOTOR CONTROL SYSTEM AND CIRCUITRY THEREFOR
Frank V. Frola, Monroeville, Pa., assignor to Westinghouse Electric Corporation, Pittsburgh, Pa., a corporation of Pennsylvania
Filed May 19, 1964, Ser. No. 368,484
8 Claims. (Cl. 318—176)

The present invention relates to synchronous motors and more particularly to brushless synchronous motor control systems and circuitry therefor.

The use of a brushless synchronous motor is particularly advantageous in installations where periodic or continuous explosive atmospheres are encountered, as in refineries, or where a premium is placed on having reduced motor maintenance, as on ships. This special utility stems from the elimination of brushes which otherwise may produce hazardous sparking and require relatively frequent replacement.

Without brushes, however, there arises a need to incorporate a control system in the motor rotating portion which usually includes a common shaft on which there is disposed both the motor rotor with its field windings and an exciter armature. Generally this need for control stems from the characteristic operating requirements of a synchronous motor during the periods of startup and normal operation. Since the control system or circuitry must undergo rotation during motor operation, circuit components (such as switches) dependent upon mechanical principles of operation are normally inappropriate. Instead, static components or circuit blocks are desirable; for example, where a switching function is to be provided it is preferable that solid state semiconductor switching devices be employed.

To start the motor, it is required that DC excitation be withheld from the rotor field windings since large pulsating torques and large stator currents are otherwise produced and the net torque is substantially zero. With DC field energization withheld, induction motor action is used to start the motor, and the rotor field windings must be connected in a closed circuit loop during the startup period so as to avoid insulation damage by the relatively high open circuit voltage otherwise induced in the field windings. Special amortisseur windings or cages are usually provided on the rotor pole faces to produce an induction motor torque which, when combined with the torque produced by the closed field windings, provides the necessary or desired total startup torque. Preferably the field windings are closed through a starting and discharge resistor so that substantial startup torque can be derived from the resulting resistive component of current through the field windings.

The rotor is thus accelerated toward synchronous speed, but the slip frequency becomes insufficient to produce the final torque needed to bring the rotor precisely up to synchronous speed. Hence, at a rotor speed of say 95% of synchronous speed, it is necessary to apply DC excitation to the rotor field windings. The minimum rotor speed at which DC excitation can be applied with resultant synchronism is determined principally by the inertia of the rotor and its load since these factors in turn are determinative of the required pull-up torque and the time period during which the pull-up torque must be applied.

Similarly, there is a maximum rotor speed at which the DC application can be successfully made, and it is fixed by the crossover point of the motor torque characteristic and the load torque characteristic. Typically, the motor torque characteristic drops off rapidly as synchronous speed is approached, and the DC application thus must be made at a rotor speed above the determined minimum rotor speed but below that rotor speed at which the motor torque becomes lower than the torque required for continued load acceleration. Normally, if the rotor fails to reach synchronism within one or two slip cycles with the motor torque available after DC application at a given rotor speed, the rotor will decelerate.

While there is thus a limited rotor speed range within which DC excitation can be applied to achieve synchronism, it is usually preferable to apply the DC excitation at the optimum rotor speed within the allowable speed range. This speed normally is the speed at which developed motor torque is nearly maximum. It is also necessary that the DC excitation be applied within a certain phase range of the slip voltage cycle, but preferably just as the slip voltage changes polarity to an aiding relation with the DC excitation voltage. The best rotor speed or best slip voltage frequency and the best phase point in the slip voltage cycle thus correspond to an optimum time point in the time varying slip voltage waveform at which the DC excitation is most advantageously applied.

Synchronous motor control circuitry thus should operate to apply DC excitation substantially at the predetermined best time in the slip voltage waveform or at the very least substantially at the predetermined best slip voltage frequency and at some suitable phase point in the slip voltage cycle at that slip frequency. The same control circuit operating goals govern motor resynchronization if the motor should pull out of synchronism for overloading or other reasons.

Since the motor torque must be greater than the opposing load torque at all times during the startup period, it is usually necessary that the field discharge circuit remain conductive until motor synchronism is obtained so that the necessary total motor torque can be developed throughout the startup period. After synchronism, the motor control circuitry thus also must operate to open the field discharge circuit so as not to drain the DC excitation current.

In accordance with the principles of the present invention, a synchronism motor control system comprises a semiconductor exciter switch which transmits DC excitation energy to the motor field winding means and a semiconductor discharge switch which controls the continuity of an induced current discharge path through the field winding means and a field discharge resistor. To produce synchronism, gating circuit means provide a sharp signal or pulse in response to induced or slip voltage across the field winding means, and the exciter switch is closed at a substantially predetermined and preferably the best time in the slip voltage waveform or at a substantially predetermined slip voltage frequency. DC exciting current then flows through the exciter switch to energize the field winding means and synchronize the motor. After synchronism, a signal can be derived from the field resistor to operate control means for opening the field switch and the field discharge path. If the motor should pull out of synchronism, the exciter switch can be reopened in response to an AC exciter signal and synchronism is regained in the manner described.

It is therefore an object of the invention to provide a novel control system for efficiently effecting synchronism in a brushless synchronous motor.

Another object of the invention is to provide a novel control system for efficiently effecting timely application of DC excitation to the field winding means of a brushless synchronous motor so as efficiently to achieve synchronism.

A further object of the invention is to provide a novel control system for a brushless synchronous motor wherein a sharp signal or pulse is employed to achieve timely application of DC field energization so as efficiently to achieve synchronism.

An additional object of the invention is to provide a novel control system for a brushless synchronous motor wherein DC excitation is applied at a substantially predetermined time in, or slip frequency and phase of, the slip voltage waveform so as efficiently to achieve synchronism.

Another object of the invention is to provide a novel control system for a brushless synchronous motor wherein DC excitation is applied substantially at the best point in time in the slip voltage waveform so as efficiently to achieve synchronism.

It is another object of the invention to provide a novel control system for a brushless synchronous motor wherein resynchronization is efficiently achieved whenever the motor pulls out of synchronism.

A further object of the invention is to provide a novel control system for a brushless synchronous motor wherein the field discharge path is efficiently opened to remove the field discharge resistance after the motor has been synchronized.

An additional object of the invention is to provide novel firing circuitry which operates in an efficient and timely manner.

These and other objects of the invention will become more apparent upon consideration of the following detailed description along with the attached drawings, in which:

FIGURE 1 is a schematic view of a brushless synchronous motor and its control system arranged in accordance with the principles of the invention;

FIG. 2 is a schematic view of a DC field applying circuit employed in the control system of FIG. 1;

FIGS. 3 and 4 show schematic views of respective circuit species which can be used in the control system of FIG. 1 to provide for resynchronizing after the motor has pulled out of synchronism;

Figure 4:
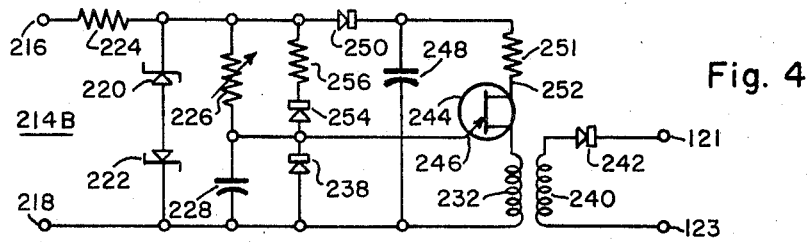

More specifically, there is shown schematically in FIG. 1 a brushless synchronous motor 10 having any suitable power rating. The motor 10 has a three phase stator winding 12 and an exciter field winding 14 which are both suitably mounted on stator frames of any usual or desired physical construction. The stator winding 12 is suitably energized, for example by a three phase AC source (not shown) and the exciter field winding 14 is suitably energized by a DC source (not shown). If desired, a rectifier (not shown) can provide excitation power for the exciter field 14 from the AC source.

The stator winding 12 produces a rotating magnetic flux wave in a rotor-stator air gap (not shown) and thereby interacts with motor field winding means 16 and amortisseur windings (not shown) to produce startup and synchronous operating torques for the motor 10. The field winding means 16 and the amortisseur windings are suitably disposed on a predetermined number of salient rotor poles in accordance with well established synchronous motor design principles.

The exciter field 14 interacts with a rotating exciter armature winding 18 which generates the necessary energy for exciting the motor winding means 16 and thereby eliminates the need for brushes otherwise used in transmitting excitation energy to the rotating field winding means 16 from a stationary power source through collector rings. A common shaft (not shown) is preferably employed for the field winding means 16 and the exciter armature 18 as well as control system 20 which is connected between the exciter armature 18 and the field winding means 16. Those components which are within dotted box 22 in FIG. 1 are thus all subject to rotation.

The control system 20 provides control action which normally assures development of startup torque through induction motor action as well as the final synchronous pull-up torque through timely application of DC excitation across the field winding means 16. Thereafter, DC excitation is continuously applied to the field winding means 16 so as to provide the operating torque necessary to drive the motor load at synchronous speed. During the startup period, the field winding means 16 discharge current through a field resistance so as to prevent winding insulation damage from open circuit induced voltages and so as to increase the torque developed by the motor 10 during the startup period. Once synchronous speed is obtained, the field discharge resistance is removed by opening the field discharge circuit path.

The control system 20 provides this performance by means of circuitry having solid state or other static components which can reliably function while undergoing the severe forces developed during rotation. The description of circuit operation which follows is set forth as it is presently understood in terms of established circuit theory, and this is done only to clarify and not to limit the invention.

More specifically, a rectifier 24 is connected to the exciter armature 18 for the purpose of providing DC excitation for the field winding means 16 through DC excitation circuit path 26, 28, 30 and 32. The rectifier 24 can be a three phase full wave rectifier, and it thus includes feeder diodes 34, 36 and 38 and return diodes 40, 42 and 44. Direct excitation current is blocked from flowing by semiconductor switching means or silicon controlled rectifier switch 46 unless firing or gating circuit 48 is operated to apply a gating pulse to gate and cathode terminals 49 and 51 and thereby fire the exciter switch 46. Gated excitation current through the exciter switch 46 can have substantial amplitude, and the switch 46 is provided with a current rating suitable for the particular synchronous motor in which it is used.

Field discharge circuit path 50, 52, 54 and 56 or 58 provides for the discharge of induced field current through field discharge resistor 68 from the field winding means 16. Induced field current components of one polarity are carried through branch 56 and diode 59 when field winding terminal 60 is negative relative to field winding terminal 62, and when the polarity is reversed semi-conductor switching means or field discharge silicon controlled rectifier switch 64 carries the induced field current components of the opposite polarity through circuit branch 58 once the avalanche or breakdown voltage of Zener gate diode 66 is surpassed. Hereinafter, whenever the term positive field voltage is used, it is meant that the polarity of the induced field voltage is such that the field terminal 60 is positive relative to the field terminal 62.

When the motor reaches synchronous speed, there is substantially no induced field current in the discharge path 50, 52, 54 and 56 or 58 because the field winding means 16 are then rotating in synchronism with the rotating flux wave produced by the stator winding 12. Further, at synchronism, there is substantially no current in the field discharge resistor 68 since the diode 59 and the field discharge switch 64 normally block DC excitation current from the DC excitation path branch 28 as will subsequently be discussed more fully.

The gating circuit 48 (FIG. 2) fires the exciter switch 46 substantially at a predetermined and preferably the best time in the slip voltage waveform. The best point in time corresponds to a predetermined best slip voltage frequency (say 95% synchronous speed) and the best phase of the slip voltage cycle at the predetermined slip frequency. Accordingly, once the slip frequency has decreased to the predetermined value (say 3 or 4 cycles per second) and the slip voltage cycle reaches the best phase position, the exciter switch 46 is sharply fired. Firing of the exciter switch 46 is dependent primarily on slip voltage frequency and not to any material extent on other system factors (such as age and temperature varying switch gating or other similar component characteristics which only produce error influence in the timing of circuit operation).

More specifically, an input for the gating circuit 48 is connected across the field winding means 16 through field terminals 60 and 62 so as to be directly responsive to the slip voltage frequency.

By "directly responsive," it is meant to refer to a relationship by which the exciter switch 46 is fired in direct dependency on the slip or induced field voltage frequency without any material dependance on any intermediate operating circuit parameters. Within this meaning, it is thus appropriate to connect the gating circuit 48 to field resistor terminals 140 and 142 rather than the field winding terminals 60 and 62. The fact that the field discharge switch 64 does not conduct until shortly after the beginning of each positive half cycle of slip voltage does not materially affect the frequency sensitive operation of the gating circuit 48 if it is connected to the field resistor terminals 140 and 142.

The voltage across the field terminals 60 and 62 is clipped or dropped to a lower but ample level by means of a pair of Zener diodes 70 and 72 connected across the field terminals 60 and 62 through current limiting resistor 74. One advantage gained by clipping the field voltage in this manner is that the control system 20 can be standardized for employment in motors of various ratings. Another is that lower rated control components can be used.

The clipped voltage produced by the Zener diodes 70 and 72 has the same frequency as the induced field voltage and energizes firing circuit 76 which controls switching means or silicon controlled rectifier frequency switch 78. In addition, the clipped voltage produced by the Zener diodes 70 and 72 is further clipped by means of Zener diode 80 through current limiting resistor 82. In turn, the clipped voltage produced by the Zener diode 80 also has the same frequency as the induced field voltage and is applied to firing circuit 84 which controls the conductivity of switching means or unijunction transistor phase switch 86.

The phase switch 86 and the frequency switch 78 are connected in a series path through primary 88 of a transformer having a suitable well known design, and a signal is thus produced in transformer secondary 90 for application through rectifier 92 to the gating terminals of the exciter switch 46 only if the phase switch 86 and the frequency switch 78 are both in a conductive state. Resistor 94 bypasses the transformer primary 88 and the frequency switch 78 so as to provide a continuous path for the phase switch 86 and more particularly so as to provide for voltage application across the phase switch 86 when the frequency switch 78 is in a nonconductive state.

In the firing circuit 76, resistor 104 and charging capacitor 96 form a series RC energy storage circuit combination across which there is applied the clipped voltage produced by the Zener diodes 70 and 72. The resistor 104 is preferably variable so that time constant $\tau_1$ (FIG. 7) of the firing circuit 76 can be modified to change the slip frequency at which the frequency switch 78 is fired.

When the slip frequency has decreased to the predetermined value where in any given positive field voltage half cycle the capacitor 96 is charged to a voltage level which exceeds the avalanche voltage of Zener diode 98 connected in series between RC circuit junction 100 and the gating terminal of the frequency switch 78 through current limiting resistor 102, the frequency switch 78 is gated by current which flows from field terminal 60 through the Zener diode 98. The gating current for the frequency switch 78 continues to flow after the field voltage begins to turn negative since the capacitor 106 then begins to discharge through the Zener diode 98. However, cathode-anode current does not flow through the frequency switch 78 until the slip voltage cycle advances to the point where the phase switch 86 is fired.

Capacitor 106 is provided with a relatively low value of impedance and bypasses the gating terminal of the frequency switch 78 so as to shunt stray high frequency voltages from the frequency switch 78. Diode 108 is connected across the charging capacitor 96 so as to provide a bypass path for negative components of induced field current and thereby assure a set charge condition on the capacitor 96 at the start of each positive half cycle.

The phase switch 86 is provided in series with the transformer primary 88 and the frequency switch 78 in the exciter gating circuit 48 so as to delay firing the exciter switch 46 until approximately the beginning of the negative slip voltage half cycle following the positive half cycle in which the frequency switch 78 is fired. It is in this sense that the switch 86 is characterized as a phase switch.

As already indicated, it is necessary that the exciter switch 46 be fired within a prescribed phase range of the slip voltage cycle, usually at some point from approximately the beginning to nearly the end of a negative half cycle of induced field voltage. The reason for the phase requirement is that the pull-up torque which is to be produced by the flow of direct excitation current through the field winding means 16 from the exciter armature 18 be applied at a point in time where the magnetic rotor field poles and the stator produced rotating magnetic flux poles are in relative positions which aid rather than oppose the needed pull-up torque. Generally, in providing for firing the exciter switch 46 approximately as the slip voltage crosses zero value, the phase switch 86 operates at the best phase point in the allowable phase range of the slip voltage cycle.

Specifically, the phase switch or unijunction transistor 86 is fired by an RC energy storage combination in the firing circuit 84 including preferably variable resistor 110 and charging capacitor 112. A base terminal 114 of the unijunction transistor 86 is connected through resistor 116 and the current limiting resistors 82 and 74 to the field terminal 60, and base terminal 118 of the unijunction transistor 86 is connected to the transformer primary 88 and through the bypass resistor 94 to the field terminal 62. Emitter terminal 120 of the unijunction transistor 86 is connected to circuit junction 122 between the resistor 110 and the charging capacitor 112.

Figure 7:
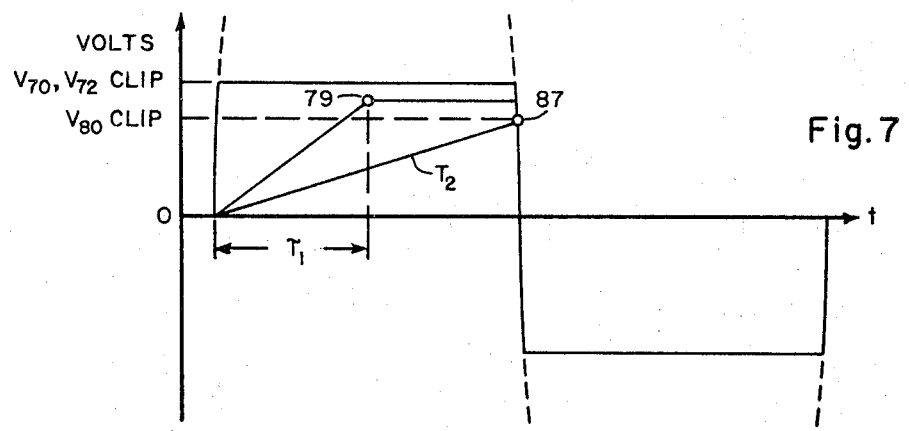
FIG. 7 graphically shows the voltage conditions for application of DC excitation to the motor field windings.

The voltage diagram in FIG. 7 shows one full cycle of clipped slip voltage in which the frequency and phase switches 78 and 86 are both gated or fired as indicated respectively by reference points 79 and 87. Thus, the charging rate $T_2$ of the capacitor 112 is slightly slower than that of the capacitor 96 so that the unijunction transistor 86 fires at the end of each positive half cycle of field voltage including the half cycle or half cycles in which the frequency switch 78 is fired. When the positive polarity of the transistor base terminal 114 drops rapidly at the end of each positive half cycle, the charged voltage of the capacitor 112 is sufficient to bias the transistor P-N junction forwardly and inject a capacitor discharge current through the emitter and base terminals 120 and 118.

The phase switch or unijunction transistor 86 is then fired and the capacitor discharge current completes its loop path either through the resistor 94 alone or through both the resistor 94 and the frequency switch 78 which, when gated by the Zener diode 98, remains gated until after the phase switch 86 is fired. The resistor 94 preferably has sufficient resistance value to cause most of the discharge current to flow through the transformer primary 88 and the frequency switch 78 when the switch 78 is gated. The sharp current pulse which flows through the transformer primary 88 produces a sharp gating pulse through the exciter switch terminals 49 and 51 and the exciter switch 46 immediately fires or becomes conductive because of the forward DC excitation voltage applied across it. The gating pulse is characterized as "sharp" since it rises sharply to an amplitude which is ample for gating purposes and thereby fires the switch 46 in a timely and positive manner. Once the exciter switch is fired, the circuit 48 merely operates as a relaxation oscillator without affecting the continuity through the exciter switch 46.

In brief summary of the firing of the exciter switch 46, the operation of the gating circuit 48 is dependent substantially only on the frequency of the induced field (slip) voltage for its operation. This voltage when clipped provides ample voltage level for generating a sharp firing signal or pulse for the exciter switch 46. The firing pulse is generated substantially at a predetermined slip frequency and preferably substantially at a predetermined phase of the slip voltage cycle as well. It is noted that the voltage clipping Zener diodes 70 and 72 can acquire modified avalanche characteristics with age and in turn this will have some effect on the frequency at which the circuit 76 responds to trigger the frequency switch 78. However, this variation in frequency sensitivity is relatively nominal as compared to the frequency sensitivity variation which results in circuitry where switch gating characteristics are material determinants of the point in time at which DC excitation is applied to synchronous motor field winding means.

The field resistor 68 is preferably left in the field discharge circuit 50, 52, 54 and 56 or 58 until synchronism is obtained as a result of the pull-up torque developed by the application of DC excitation to the field winding means 16 through the exciter switch 46. At that point the induced field current substantially diminishes to zero, and substantially no current is conducted through the diode 59 in the field discharge circuit branch 56. In order to block DC excitation current from flowing through the field resistor 68 from the fired exciter switch 46, the field discharge switch 64 must be in a blocking or non-conductive state.

In some cases, the discharge switch 64 becomes non-conductive as the exciter switch 46 is fired, that is, the field terminal 60 is sufficiently negative with respect to the field terminal 62 to extinguish the discharge switch 64 just at the instant or just before the instant when the exciter switch 46 is fired. However, in other cases the discharge switch 64 may not be extinguished even though the field terminal 60 may be slightly negative relative to field terminal 62 or at zero potential relative thereto at the instant the exciter switch 46 is fired. In this event, the DC excitation voltage, although insufficient to initiate firing of the discharge switch 64, can maintain the switch 64 in its fired or conductive state and excitation current then drains through the field resistor 68 unless other measures are taken to open the switch 64.

To open the discharge switch 64, it is necessary that the exciter switch 46 be reopened so as to remove the DC excitation voltage from application across the discharge switch 64. The exciter switch 46 is then preferably refired almost instantaneously, say within an interval of microseconds, so that the synchronous motor 10 is not caused to pull out of synchronism.

To produce this circuit functioning, semiconductor switching means or silicon controlled rectifier cutout switch 120 is connected across the exciter switch 46 through energy storage means or a capacitor 122. The cutout switch 120 is normally in a non-conductive state since the DC excitation voltage is insufficient to produce conduction without a gating signal applied to gate and cathode terminals 121 and 123 of the cutout switch 120.

Once the exciter switch 46 is fired in the start-up period, the DC excitation voltage charges the capacitor 122 through circuit branch 124 which includes current limiting resistor 126 and diode 128. Return junction 130 is provided between diodes 38 and 44 (or between either of the other two pairs of diodes) so that the circuit branch 124 carries no induced current from the field winding means 16 during the startup period.

When the exciter switch 46 is to be turned off to open the discharge switch 64 and the field resistor discharge path 50, 52, 54 and 58 (or to achieve resynchronizing circuit action after pull-out as will subsequently be described) the cutout switch 120 is fired, in this case by firing circuit 132. The stored voltage on the capacitor 122 is then immediately applied as a back voltage across the exciter switch 46 to cause it to turn off within its characteristic turn off time.

Simultaneously, the capacitor 122 begins to discharge its stored charge through the discharge switch 64 and the field winding means 16 and then through path 32 and through return diodes 40, 42 and 44. To assure sufficient time for opening the exciter switch 46, the discharge current is preferably substantial, and for this purpose the capacitor 122 preferably is provided with a relatively large value of capacitance, say 70 to 100 mfd. If an electrolytic capacitor is used to gain the advantage of small physical size, the capacitance value of the electrolytic capacitor is preferably set about twice as high as that value actually needed because of the characteristic capacitance decrease evidenced by electrolytic capacitors with aging.

With the removal of the excitation voltage from the field winding terminals 60 and 62 as the exciter switch 46 is turned off, discharge current from the capacitor 122 continues to flow through the field winding means 16 and the stored field energy immediately begins to drive a current, with time decay characteristics, through flow path 52, 54 and 56. The instantaneous reversal of current through the field resistor 68 thus results in a back voltage applied across the discharge switch 64 so as to open it to its nonconductive state.

When the exciter switch 46 is then refired through firing circuit 134, the DC excitation voltage is again applied across the field winding means 16. The path 58, 54 through the field resistor 68 is then open because the discharge switch 64 is in a nonconductive state and the total DC excitation current is transmitted through the field winding means 16. In the interim between opening and reclosing the exciter switch 46, the cutout switch 120 is reopened when forward voltage appears across the feeder diode 38 or when a reverse voltage is otherwise caused to be applied across the cutout switch 120. As noted previously, all of the circuit action just described preferably takes place in an interval of microseconds so as to avoid pull-out from motor synchronism.

Figure 5:
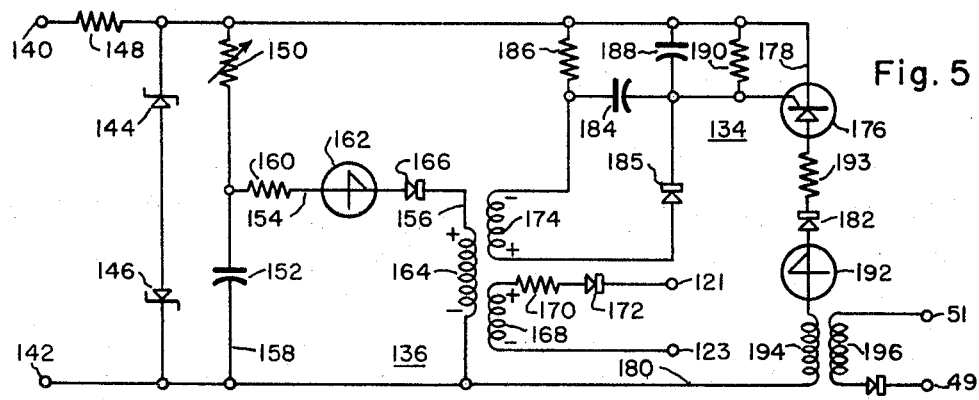
FIGS. 5 and 6 shows schematic views of respective species of a field resistor removing circuit which can be employed in the control system of FIG. 1.
Figure 6:
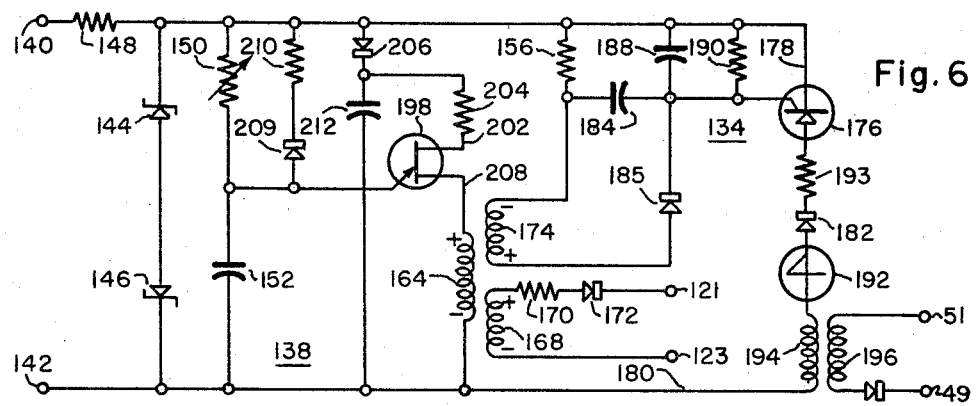

To provide for firing the cutout switch 120 and for refiring the exciter switch 46 in the manner described, the firing circuit 132 and the refiring circuit 134 are provided in the form of a combined firing circuit 136, as shown in the species of FIG. 5, or 138 as shown in the species of FIG. 6. In these species, like reference numerals are employed for like components. Thus, in the circuit 136 or 138, and input is connected across the field resistor terminals 140 and 142 and the voltage thus developed is clipped by Zener diodes 144 and 146 through current limiting resistor 148. An RC energy storage or charging circuit including variable resistor 150 and capacitor 152 form a portion of the firing circuit 132 (FIG. 5) or 132′ (FIG. 6) for the cutout switch 120.

In the preferred circuit 136 of FIG. 5, a discharge path 154, 156 and 158 is provided for the capacitor 152. In this path, there is included a current limiting resistor 160, a breakdown diode 162 (which has switching or breakdown characteristics similar to those of a Zener diode except that on breakdown substantially zero impedance is presented by the breakdown diode 162) and a primary 164 of a transformer of suitable well known construction and current rectifier 166. The time constant of the firing circuit 132 is set such that insufficient voltage builds up on the capacitor 152 to fire the breakdown diode 162 unless the exciter switch 46 is closed to apply DC voltage across the field resistor 68. Normally, a time constant of say two to three seconds for this voltage build-up to occur on the capacitor 152 is sufficient. In such circumstances, the capacitor 152 provides a pulse discharge through the breakdown diode 162 and the transformer primary 164 to induce a current pulse in the transformer secondary 168 which is directed to the cutout switch gating terminal 121 through current limiting resistor 170 and rectifier 172. The cutout switch 120 is then fired to open the exciter switch 46 in the manner previously described.

The current pulse through the transformer primary 164 additionally produces a pulse in another transformer secondary 174 and this pulse fires semiconductor switch means or silicon controlled rectifier refiring switch 176 to provide for refiring the exciter switch 46 in a timely manner. Resistor 170 assures proper division of transformed voltage between the transformer secondaries 168 and 174. Normally, when the field resistor terminal 140 is positive relative to the field resistor terminal 142, current through path 178, 180 and through the refiring switch 176 is blocked by diode 182. When the transformer secondary 174 is pulsed, a positive voltage is placed across capacitor 184 through diode 185 and the refiring switch 176 is thus gated by a discharge current through the gating circuit which includes the resistor 186. Capacitor 188 and resistor 190 are employed to suppress transient high frequency voltage spikes.

While the discharge current from the capacitor 184 continues to gate the refiring switch 176, the voltage across the field resistor 68 and the refiring path 178–180 is reversed as a result of the decaying field winding means current which flows through the resistor 68 as previously described. When breakdown diode 192 in the path 178, 180 then becomes conductive, the refiring switch 176 has a forward voltage applied across it and, since it is still gated, it also becomes conductive. By reason of the operation of the breakdown diode 192, the transformer primary 194 is then sharply pulsed through current limiting resistor 193 to produce a sharp pulse in transformer secondary 196 and thus to gate sharply and refire the exciter switch 46 through its gate terminal 51. The refiring pulse from the transformer secondary 196 occurs within microseconds after the cutout switch 120 is fired but after the exciter switch 46 and discharge switch 64 are opened since the refiring switch 176 does not conduct until the field resistor current (or voltage) reverses. Although the circuit functioning produced by the cutout switch 120 and its firing circuit 132 (or 132') and the refiring circuit 134 for the exciter switch 46 is not needed in all applications, such functioning does produce the desired result of turning off the discharge switch 64 efficiently without affecting the synchronous speed of the motor 10 where it is determined that such turn off action is required.

It is further noted that since the circuit branch 178–180 becomes conductive only when field voltage reverses such that the field terminal 142 is positive relative to the field terminal 140, the entire circuit 136 (with minor modifications) is especially suitable for employment in firing the exciter switch 46 for original application of the DC excitation in a manner similar to that described for the gating circuit 48. Thus, the circuit 136 when modified to fire only the exciter switch 46 does so only after the discharge switch 64 is opened with field voltage reversal, and there is then normally no need for incorporating a field resistor removing circuit 136 or 138 in the control system 20. For this purpose, then, the transformer secondary 168 is eliminated, resistance (not shown) can be placed in series with the transformer secondary 174 and the diode 185, and the resistor 150 and the capacitor 152 can be chosen to achieve breakdown of the diode 162 on a positive half cycle substantially at a preselected slip voltage frequency. Current is then discharged through the transformer primary 164 to gate the switch 176, and while the switch 176 is still gated the field voltage goes negative to open the discharge switch 64 and break down the diode "switch" 192. With the switches 176 and 192 jointly conductive, the exciter switch 46 is sharply pulsed across the gating terminals 49 and 51 (FIG. 1) and DC excitation is applied to the field winding means 16 within the best phase range in the slip voltage cycle. The circuit operation just described is more fully disclosed in a copending application of A. H. Hoffmann and F. V. Frola, Ser. No. 460,265, filed June 1, 1965.

The combined firing circuit 138 shown in FIG. 6 is similar to the combined firing circuit 136 shown in FIG. 5, except that a unijunction transistor 198 is employed in the firing circuit 132' in place of the breakdown diode 162 for controlling the point in time at which the transformer primary 164 is pulsed. The refiring circuit 134 for the exciter switch 46 is identical in the two combined firing circuits 136 and 138. Thus, emitter terminal 200 of the unijunction transistor 198 is connected to the charging capacitor 152 and base terminal 202 is connected to the field terminal 140 through the resistor 148 and through resistor 204 and rectifier 206. Base terminal 208 is connected directly to the transformer primary 164. The transistor emitter terminal 200 is also connected through rectifier 209 and current limiting resistor 210 to the resistor 148.

When sufficient positive voltage is built up on the charging capacitor 152 in the firing circuit 132' as in the case of the firing circuit 132, a current pulse is injected through the transistor emitter terminal 200 to the transformer primary 164 since the transistor P–N junction between the emitter and base terminals 200 and 208 becomes forward biased. The cutout switch 120 is then fired by the transformer secondary 168 and the voltage across the field resistor 68 and the field terminals 140 and 142 reverses in the manner previously indicated.

To prevent the unijunction transistor 198 from firing each time the field voltage reverses to a negative polarity, the capacitor 212 and the diode 206 delay the appearance of a negative potential on the base terminal 202 relative to the emitter terminal 200. In addition, the diode 209 and the resistor 210 promote the decay of voltage on the capacitor 152 so as to increase the rate at which the emitter terminal 200 goes toward a negative polarity. In the combined firing circuit 138, the cutout switch 120 is thus fired by the firing circuit 132' in a manner similar to that described for the firing circuit 132, and shortly thereafter the exciter switch 46 is refired by the firing circuit 134 as already described.

Once the exciter switch 46 is in a continuing state of conduction and the field discharge switch 64 is opened, the motor 10 normally maintains its synchronous speed and delivers the required load torque. At various times, however, such as when the required load torque exceeds the available synchronous torque or when a substantial voltage decrease appears across the motor stator 12, the motor 10 can pull out of synchronism and it is then necessary that the control circuit 20 operate to produce a resynchronizing torque.

In some applications, the negative field voltage which is induced when the motor pulls out of synchronism can be sufficient, say at 90% of synchronous speed, to apply a back voltage across the exciter switch 46 and thus cause it to be reopened. In such case, resynchronizing circuit action is instituted by induction motor action in the manner already described, since the field discharge switch 64 is then fired when the Zener diode 66 breaks down in response to the induced positive field voltage.

In a number of cases, however, the negative induced field voltage is insufficient to cause the foregoing circuit action to occur at the minimum pull out speed at which it is desired to begin applying a resynchronizing torque. It is then preferred to employ firing circuit 214 which is connected across the gate and cathode terminals 121 and 123 of the cutout switch 120.

Two species of the firing circuit 214 are shown respectively in FIGS. 3 and 4 as firing circuits 214A and 214B. These circuits are similar in that each has input terminals 216 and 218 connected across one or more of the phases of the exciter armature 18 (see FIG. 1 for one example), and the AC voltage developed across the terminals 216 and 218 is then clipped by means of Zener diodes 220 and 222 through current limiting resistor 224. An RC energy storage circuit including variable resistor 226 and capacitor 228 is determinative of the time it takes for the capacitor 228 to charge up to a given voltage level during any positive half cycle of voltage appearing on the terminal 216 relative to the terminal 218.

In the circuit 214A of FIG. 3, the capacitor 228 discharges a current pulse through current limiting resistor 230 and transformer primary 232 when the charged voltage on the capacitor 228 is sufficient to cause breakdown diode 234 to become conductive. This occurs when the frequency of the exciter voltage has dropped to a predetermined value, for example that value associated with 90% of synchronous speed. Hence, the circuit 214A does not operate at higher motor speeds, and at lower speeds during initial starting the circuit 214A does operate, in a manner now to be described, but does so without affecting the exciter switch 46 since this switch is normally open anyway at such lower speeds in the initial startup period.

Rectifier 236 prevents the flow of reverse current through the breakdown diode 234, and rectifier 238 bypasses the capacitor 228 on negative half cycles of exciter voltage to assure a set starting charge condition on the capacitor 228 each time the exciter voltage goes positive. A current pulse in the transformer primary 232 produces a current pulse in transformer secondary 240 which is directed through rectifier 242 to the cutout switch gate terminal 121. This fires the switch 120 into a conductive state and, in the manner previously described in connection with the field discharge switch 64, the exciter switch 46 is then opened to a nonconductive state. Induction motor action then follows with induced field currents discharged through the field resistor 68 and the diode 59 and the field discharge switch 64 in the field discharge path 50, 52, 54 and 56 or 58.

The end results achieved by the firing circuit 214B are similar to those achieved by the firing circuit 214A, but the firing circuit 214B differs from the latter firing circuit primarily in that unijunction transistor 244 is connected between the exciter armature terminals 216 and 218 through resistor 251 and the resistor 224 so as to provide for gating the discharge current pulse from the capacitor 228 through the transformer primary 232. Like reference characters are thus employed for like components in the circuits of FIG. 3 and FIG. 4.

In the case of the firing circuit 214B, the positively charged capacitor 228 injects its discharge current through emitter terminal 246 of the unijunction transistor 244 when the frequency of the exciter voltage has dropped sufficiently low for the capacitor voltage to reach the required firing level during a positive half cycle of exciter voltage. The transformer primary 232 receives the discharge current pulse which operates the cutout switch 120 in a manner similar to the manner described in connection with the firing circuit 214A.

Capacitor 248 and diode 250 are employed as in the case of the circuit 138 (FIG. 6) to delay the development of negative potential on base terminal 252 relative to the emitter terminal 246 when the exciter voltage reverses into a negative half cycle. Further, diode 254 and resistor 256 promote rapid discharge of the capacitor 228 so as to increase the rate at which the emitter terminal 246 goes negative. The unijunction transistor 244 thus does not fire when the exciter voltage goes negative.

In brief summary of the overall circuit operation, the control system 20 operates efficiently to bring the motor 10 into synchronism with the advantages of brushless operation. Induction motor action produced by induced currents in the amortisseur windings and by the discharge current produced in the field resistor 68 from the induced voltage in the field winding means 16 brings the motor close to synchronous speed, and preferably substantially at a predetermined time in the slip voltage waveform, but at least substantially at a predetermined slip frequency, the exciter switch 46 is fired with a sharp signal or pulse from the firing circuit 48 to energize the field winding means 16 with DC excitation. The motor 10 is then brought into synchronism within one or two slip cycles.

If it is necessary to open the field discharge path by separate circuit action after synchronism is obtained, the exciter switch 46 is opened after the cutout switch 120 is fired by the firing circuit 132 and the exciter switch 46 is then quickly refired by the firing circuit 134. In the short interval between the turnoff and refiring of the exciter switch 46, the field discharge switch 64 is opened. Continuous DC excitation of the field winding means 16 is then provided.

If the motor 10 should pull out of synchronism, and if separate circuit functioning is required to turn off the exciter switch 46, the cutout switch 120 is again operated, but in this case by means of the firing circuit 214 which is responsive to a given decreased frequency level of the generated exciter voltage. Once the exciter switch 46 is turned off, the field discharge switch 64 is refired and the field discharge path through the field resistor 68 is then reclosed so as to provide sufficient induction motor action for resynchronizing the motor 10.

The foregoing disclosure has been presented only to illustrate the principles of the invention. Accordingly, it is desired that the invention be not limited by the embodiments described, but, rather, that it be accorded an interpretation consistent with the scope and spirit of its broad principles.

What is claimed is:

1. In a brushless synchronous motor having rotating field winding means, an alternating current exciter armature rotatable with the field winding means and rectifier means connected to the exciter armature to supply direct current excitation to the field winding means, a control system comprising a discharge circuit connected across said field winding means and including a resistor for discharging current induced in the field winding means at subsynchronous speeds, a semiconductor exciter switch connected in an excitation circuit between the rectifier means and the field winding means to control said direct current excitation, a firing circuit for transmitting a sharp gating pulse to said exciter switch so as to apply the excitation voltage to said field winding means substantially at a predetermined slip voltage frequency and phase of the slip voltage cycle, said firing circuit including voltage dropping means connected across said field winding means and also including a silicon controlled rectifier frequency switch and a unijunction transistor phase switch connected in a series pulse path, a transformer connected in said series pulse path and coupled with said exciter switch so that the latter switch is fired when said series pulse path is pulsed, respective energy storage circuit means responsive to positive field voltage developed across said voltage dropping means so as respectively to fire said silicon controlled rectifier and said unijunction transistor, the energy storage means associated with said silicon controlled rectifier including a resistor-capacitor charging circuit and a diode coupling the latter circuit to said silicon controlled rectifier, said diode becoming conductive at a predetermined capacitor voltage level so that said silicon controlled rectifier is fired substantially at said predetermined slip voltage frequency, the energy storage circuit means associated with said unijunction transistor including a resistor-capacitor charging circuit coupled to the transistor emitter terminal and providing a capacitor discharge current through said transistor and said series pulse path to fire said exciter switch substantially as the induced field voltage is reversing to a negative polarity, and a resistor bypassing said transformer and said silicon controlled rectifier so as to provide a continuous path for voltage application across said transistor.

2. In a brushless synchronous motor having rotating field winding means, an alternating current exciter armature rotatable with the field winding means and rectifier means connected to the exciter armature to supply direct current excitation to the field winding means, a control system comprising a discharge circuit connected across said field winding means and including a field resistor and a semiconductor field discharge switch for closing said discharge circuit and discharging current induced in the field winding means at subsynchronous speeds, a semiconductor exciter switch connected in an excitation circuit between the rectifier means and the field winding means to control said direct current excitation, firing circuit means directly responsive to the slip frequency of voltage induced in said field winding means for transmitting a sharp gating pulse to said exciter switch so as to supply excitation current to said field winding means substantially at a predetermined slip voltage frequency and phase of the slip voltage cycle, means for opening said field discharge switch if said field discharge switch continues to conduct at synchronous speed, said opening means including a semiconductor cutout switch and a capacitor connected in a series circuit by-passing said exciter switch, said capacitor connected in relation to said rectifier means so as to be charged by DC voltage when said exciter switch is fired, second firing circuit means responsive to DC voltage developed across said field resistor after motor synchronism is obtained for firing said cutout switch, and third firing circuit means responsive at least to said second firing circuit means to refire said exciter switch in a time interval which allows said field discharge switch to be turned off before the motor can pull out of synchronism.

3. In a brushless synchronous motor having rotating field winding means, an alternating current exciter armature rotatable with the field winding means and rectifier means connected to the exciter armature to supply direct current excitation to the field winding means, a control system comprising a discharge circuit connected across said field winding means and including a field resistor and a semiconductor field discharge switch for closing said discharge circuit and discharging current induced in the field winding means at subsynchronous speeds, a semiconductor exciter switch connected in an excitation circuit between the rectifier means and the field winding means to control said direct current excitation, firing circuit means directly responsive to the slip frequency of voltage induced in said field winding means for transmitting a sharp gating pulse to said exciter switch so as to supply excitation current to said field winding means substantially at a predetermined slip voltage frequency and phase of the slip voltage cycle, means for opening said field discharge switch if said field discharge switch continues to conduct at synchronous speed, said opening means including a semiconductor cutout switch and a capacitor connected in a series circuit bypassing said exciter switch, said capacitor connected in relation to said rectifier means so as to be charged by DC voltage when said exciter switch is fired, a second firing circuit responsive to voltage developed across said field resistor so as to fire said cutout switch and turn off said exciter switch, said second firing circuit including voltage dropping means connected across said field resistor and energy storage circuit means responsive to the voltage developed across said voltage dropping means, and a breakdown diode through which said energy storage circuit means discharges a current after a given length of time during which DC excitation voltage is applied across said field resistor through said field discharge switch, means coupling the latter discharge current with said cutout switch so as to fire the same, and a third firing circuit having semiconductor refiring switching means and having an energy storage circuit coupled with said coupling means for gating said refiring switching means in response to the described discharge current through said coupling means, said third firing circuit further including diode means responsive to voltage reversal across said field resistor so as to produce a sharp current pulse through said gated refiring switching means, and another coupling means through which the latter current pulse flows so as to refire said exciter switch in an interval which allows said field discharge switch to be turned off before the motor can pull out of synchronism.

4. In a brushless synchronous motor having rotating field winding means, an alternating current exciter armature rotatable with the field winding means and rectifier means connected to the exciter armature to supply direct current excitation to the field winding means, a control system comprising a discharge circuit connected across said field winding means and including a field resistor and a semiconductor field discharge switch for closing said discharge circuit and discharging current induced in the field winding means at subsynchronous speeds, a semiconductor exciter switch connected in an excitation circuit between the rectifier means and the field winding means to control said direct current excitation, firing circuit means directly responsive to the slip frequency of voltage induced in said field winding means for transmitting a sharp gating pulse to said exciter switch so as to supply excitation current to said field winding means substantially at a predetermined slip voltage frequency and phase of the slip voltage cycle, means for opening said field discharge switch if said field discharge switch continues to conduct at synchronous speed, said opening means including a semiconductor cutout switch and a capacitor connected in a series circuit bypassing said exciter switch, said capacitor connected in relation to said rectifier means so as to be charged by DC voltage when said exciter switch is fired, a second firing circuit responsive to positive DC voltage developed across said field resistor so as to fire said cutout switch and turn off said exciter switch, said second firing circuit including voltage dropping means connected across said field resistor and energy storage means responsive to DC voltage developed across said voltage dropping means and a unijunction transistor and coupling means serially connetced together and through which the latter energy storage means discharge a current to fire said cutout switch after a given length of time during which DC excitation voltage is supplied to said field resistor through said field discharge switch, a third firing circuit having semiconductor refiring switching means and having an energy storage circuit coupled with said coupling means for gating said refiring switching means in response to the discharge current through said coupling means, said third firing circuit further including diode means responsive to voltage reversal across said field resistor so as to produce a sharp current pulse through said gated refiring switching means, and another coupling means through which the latter current pulse flows to refire said exciter switch in an interval which allows said field discharge switch to be turned off before the motor can pull out of synchronism.

5. In a brushless synchronous motor having rotating field winding means, an alternating current exciter armature rotatable with the field winding means and rectifier means connected to the exciter armature to supply direct current excitation to the field winding means, a control system comprising a discharge circuit connected across said field winding means and including a field resistor and a semiconductor field discharge switch for closing said discharge circuit and discharging current induced in the fielding winding means at subsynchronous speeds, a semiconductor exciter switch connected in an excitation circuit between the rectifier means and the field winding means to control said direct current excitation, firing circuit means directly responsive to the slip frequency of voltage induced in said field winding means for transmitting a sharp gating pulse to said exciter switch so as to supply excitation current to said field winding means substantially at a predetermined slip voltage frequency and phase of the slip voltage cycle, means for opening said field discharge switch if said field discharge switch continues to conduct at synchronous speed and for opening said exciter switch when said motor pulls out from synchronism to a given subsynchronous speed, said opening means including a semiconductor cutout switch and a capacitor connected in a series circuit bypassing said exciter switch, said capacitor connected in relation to said rectifier means so as to be charged by DC voltage when said exciter switch is fired, a firing circuit responsive to DC voltage developed across said field resistor so as to fire said cutout switch and turn off said exciter switch, said firing circuit including voltage dropping means connected across said field resistor and energy storage circuit means responsive to the voltage developed across said voltage dropping means, and a breakdown diode through which said energy storage circuit means discharges a current after a given length of time during which the DC excitation voltage is applied across said field resistor through said field discharge switch, means coupling the latter discharge current with said cutout switch so as to fire the same, a second firing circuit having refiring switching means and having second energy storage circuit means coupled with said coupling means for gating said refiring switching means in response to the discharge current through said coupling means, said second firing circuit further including diode means responsive to voltage reversal across said field resistor so as to produce a sharp current pulse through said gated refiring switching means, and another coupling means through which the latter current pulse flows to refire said exciter switch in an interval which allows said field discharge switch to be turned off before the motor can pull out of synchronism, said opening means further including third energy storage circuit means responsive to the frequency of alternating voltage developed across said exciter armature for firing said cutout switch at a predetermined value of said exciter frequency, said third energy storage circuit means including another voltage dropping means and another capacitor responsive to voltage developed across said other voltage dropping means, and coupling means and a breakdown diode serially connected together and through which said other capacitor discharges a current so as to fire said cutout switch and open said exciter switch at said predetermined exciter frequency.

6. In a brushless synchronous motor having rotating field winding means, an alternating current exciter armature rotatable with the field winding means and rectifier means connected to the exciter armature to supply direct current excitation to the field winding means, a control system comprising a discharge circuit connected across said field winding means and including a field resistor and a semiconductor field discharge switch for closing said discharge circuit and discharging current induced in the field winding means at subsynchronous speeds, a semiconductor exciter switch connected in an excitation circuit between the rectifier means and the field winding means to control said direct current excitation, a firing circuit for transmitting a sharp gating pulse to said exciter switch so as to supply excitation current to said field winding means substantially at a predetermined slip voltage frequency and phase of the slip voltage cycle, said firing circuit including voltage dropping means responsive to slip voltage developed across said field winding means and also including a semiconductor frequency switch and a semiconductor phase switch connected in a series pulse path which when pulsed fires said exciter switch, means responsive to voltage developed across said voltage dropping means for firing said frequency and phase switches to produce a current pulse through said series pulse path substantially at said predetermined slip voltage frequency and substantially as the induced field voltage is reversing to a negative polarity in aiding relation with the polarity of the DC excitation voltage, and means for opening said field discharge switch if said field discharge switch continues to conduct at synchronous speed and for opening said exciter switch when said motor pulls out from synchronous speed to a given subsynchronous speed, said opening means including a semiconductor cutout switch and a capacitor connected in a series circuit by-passing said exciter switch, said capacitor connected in relation to said rectifier means so as to be charged by DC voltage when said exciter switch is fired, energy storage circuit means responsive to the frequency of alternating voltage developed across said exciter armature for firing said cutout switch and opening said exciter switch at a predetermined value of said exciter frequency, said opening means further including another energy storage circuit means responsive to DC voltage applied across said field resistor and through said field discharge switch after motor synchronism is obtained so as to fire said cutout switch and open said exciter switch, and additional firing circuit means responsive at least to said other energy storage circuit means to refire said exciter switch in a time interval which allows said field discharge switch to be turned off before the motor can pull out of synchronism.

7. A control system as set forth in claim 4, wherein said second firing circuit also includes emitter-base circuit means for said unijunction transistor including a diode-resistor path and a capacitor for controlling the emitter-base potential difference and preventing firing of said unijunction transistor when said field resistor voltage is negative.

8. In a synchronous motor having a rotating field winding, an alternating current exciter having an armature rotatable with the motor field winding, and rectifier means connected to the exciter armature and rotatable therewith for supplying direct current excitation to the motor field winding, a field discharge resistor, means including a semi-conductor field discharge switch for connecting said discharge resistor across the motor field winding, a control system for the motor field winding comprising semiconductor excitation switch means connected between said rectifier means and the motor field winding to control said direct current excitation, circuit means for supplying a gating signal to said excitation switch means, said circuit means including means responsive to the frequency of the voltage induced in said field winding at subsynchronous speeds of the motor and means responsive to the phase position of said induced voltage, said frequency responsive means and phase position responsive means cooperating to supply a gating signal to the excitation switch means at a predetermined frequency and phase position of said induced voltage to actuate the excitation switch means to become conductive and apply direct current excitation to the field winding, means for maintaining said field discharge switch in the conductive state while said induced voltage is present, means responsive to gating of the excitation switch means to conductive condition for making the excitation switch means nonconductive and for effecting a momentary reversal of voltage across the field discharge switch to make the field discharge switch nonconductive, and means for immediately thereafter applying a gating signal to the excitation switch means to restore it to the conductive state.

References Cited

UNITED STATES PATENTS

| 3,350,613 | 10/1967 | Brockman et al. | 318—183 XR |
| 3,020,463 | 2/1962 | MacGregor | 318—183 |
| 3,098,959 | 7/1963 | Rosenberry | 318—183 |
| 3,100,279 | 8/1963 | Rohner | 318—176 |

ORIS L. RADER, *Primary Examiner.*

G. RUBINSON, *Assistant Examiner.*